United States Patent [19]
Nakasaki

[11] 4,121,641
[45] * Oct. 24, 1978

[54] PNEUMATIC TIRE FOR MOTORCYCLE

[75] Inventor: Eiji Nakasaki, Kakogawa, Japan

[73] Assignee: Sumitomo Rubber Industries, Ltd., Kobe, Japan

[*] Notice: The portion of the term of this patent subsequent to Sep. 14, 1993, has been disclaimed.

[21] Appl. No.: 711,594

[22] Filed: Aug. 4, 1976

[30] Foreign Application Priority Data

Nov. 29, 1975 [JP] Japan .................. 50-143096

[51] Int. Cl.$^2$ .................................. B60C 9/02
[52] U.S. Cl. ........................ 152/353 R; 152/354 R
[58] Field of Search .................. 152/352, 353 R, 354, 152/357 R, 362 R, 362 CS

[56] References Cited

U.S. PATENT DOCUMENTS

| | | | |
|---|---|---|---|
| 2,822,016 | 2/1958 | Billingsley | 152/352 |
| 3,172,445 | 3/1965 | Boussu et al. | 152/354 |
| 3,480,065 | 11/1969 | Verdier | 152/354 |
| 3,911,987 | 10/1975 | Takusagawa et al. | 152/354 |
| 3,980,119 | 9/1976 | Nakasaki | 152/354 |
| 3,983,920 | 10/1976 | Gardner et al. | 152/362 R |

*Primary Examiner*—Albert J. Makay
*Assistant Examiner*—Donald W. Underwood
*Attorney, Agent, or Firm*—Birch, Stewart, Kolasch and Birch

[57] ABSTRACT

A pneumatic tire for use on a motorcycle, comprising a tire cover having a tread portion, a pair of opposed side walls integral with the tread portion and a pair of opposed bead portions integral with the respective side walls and adapted to firmly engage with associated rim flanges of a wheel rim. The tire cover includes a reinforcing structure for preventing the tire from collapsing when it is at least partially deflated, which reinforcing structure comprises a bias-ply carcass and a reinforcement layer. The reinforcement layer has both ends terminating adjacent and in spaced relation to the bead cores within the bead portions and is made of a plurality of juxtaposed textile cords. The reinforcing structure may have a pair of side reinforcing layers embedded in the tire cover adjacent the respective side walls.

10 Claims, 1 Drawing Figure

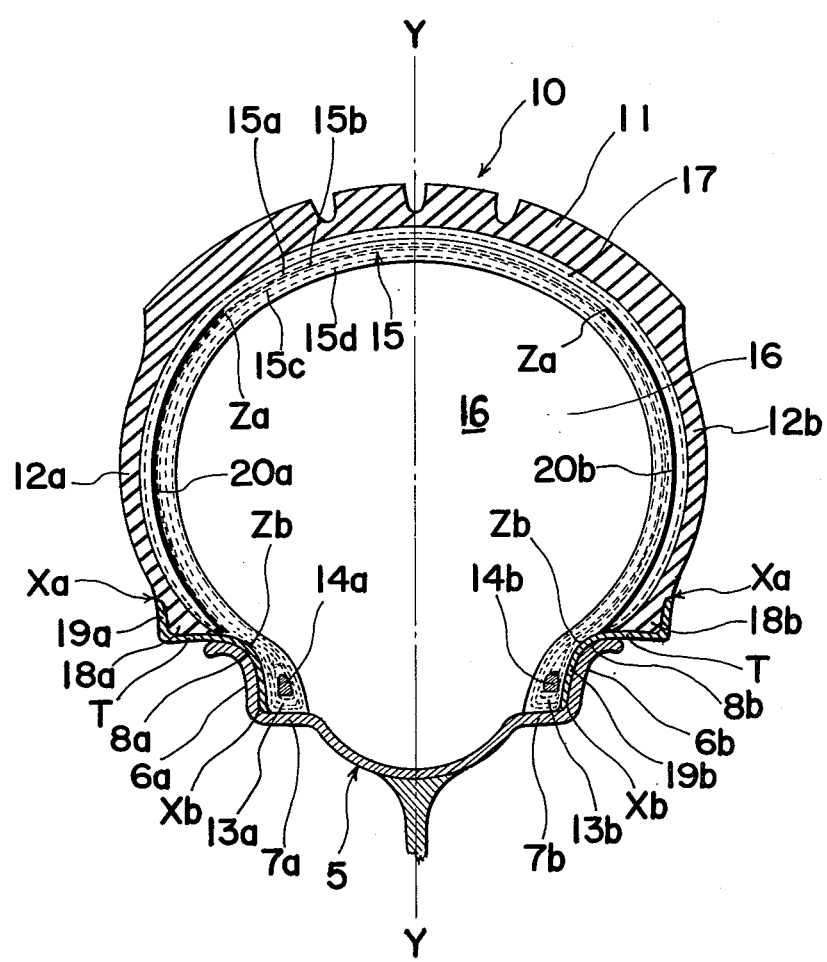

PNEUMATIC TIRE FOR MOTORCYCLE

BACKGROUND OF THE INVENTION

The present invention relates to a pneumatic tire and, more particularly, to a bias-ply tire suited for use as a front wheel tire on a motorcycle.

There is known a pneumatic tire which comprises a tire cover made of rubber material and having a tread portion, a pair of opposed side walls and a pair of opposed bead portions, and a reinforcing structure for preventing the tire from collapsing when it is at least partially deflated. The reinforcing structure includes a bias-ply carcass structure, embedded in the tire cover adjacent the inner surface thereof and having opposed ends turned up around and anchored to respective bead cores embedded in the bead portions, and at least one reinforcement layer made of cords of metallic material. The reinforcement layer in this known pneumatic tire is laid down on a bias relative to the midcircumferential plane of the tire and in opposite relation to the bias-ply carcass structure and has both ends terminating adjacent respective boundaries between the side walls and the bead portions and without being turned up around and anchored to the bead cores.

The known pneumatic tire of the above construction has been developed to provide such a feature that, even though puncture occurs in the tire during its use on a motorcycle, the motorcycle can be driven at a predetermined speed to the nearest possible repair shop without substantially adversely affecting the punctured tire. This known pneumatic tire is advantageous in that the tire during its use on a motorcycle is not readily crushed upon puncture thereof and the presence of the reinforcement layer allows the rigidity of the tire to be substantially retained to such an extent that the motorcycle having a payload imposed thereon can be driven at a reasonable speed to the nearest possible repair shop.

Although the known pneumatic tire of the above construction is satisfactory in that a motorcyclist need not be embarrassed at the time the tire on his motorcycle being operated has been pierced, some disadvantages have been found when it is used as a front wheel tire on the motorcycle. These disadvantages include reduction in cushioning effect of the tire with consequent reduction in riding comfort and reduction in steerability of the motorcycle and are attributable to the fact that, where the tire inflated to a normal pneumatic pressure is used as mounted on a front wheel of the motorcycle and where the tire inflated to a normal pneumatic pressure is used without a relatively excessive load imposed thereon, the tire in question tends to exhibit an excessive rigidity. These are particularly considerable where the motorcycle is driven at a speed of about 60 km/hr. or more.

Specifically, the reduction in cushioning effect of the tire due to the excessive rigidity thereof is undesirable not only because of the consequent reduction in riding comfort, but also because of a considerable amount of vibrations being transmitted to the prime mover, that is, the engine. In addition, the reduction is steerability tends to force the driver or motorcyclist to over-steer during high speed drive.

SUMMARY OF THE INVENTION

Accordingly, the present invention is intended to provide an improved version of the pneumatic tire of the above described construction. In particular, according to the present invention, substantial elimination of the above described disadvantages can be achieved by the employment of the reinforcement layer made of natural or synthetic fibrous material. The natural or synthetic fibrous material for the reinforcement layer may be employed in the form of a plurality of cords impregnated with a rubber material in parallel relation to each other or in the form of a non-woven fabric.

Where the reinforcement layer is constituted by a layer of juxtaposed cords of natural or synthetic fibrous material, the reinforcement layer is disposed in the tire such that each of the cords forming the reinforcement layer extends at a cord angle of from 20° to 45° relative to the midcircumferential plane thereof and in opposite relation to the direction of extension of one or two plies of the bias-ply carcass structure which is or are held in contact with the reinforcement layer in the tire.

According to another feature of the present invention, at least one rubber layer is disposed either between each side wall and the bias-ply carcass structure or between the adjacent two of plies of the bias-ply carcass structure for the purpose of minimizing flexion of the side walls occurring subsequent to the puncture of the tire and also keeping the tire in balanced state relative to the payload on the motorcycle of which the front wheel employs the tire of the present invention. Where two or more pairs of rubber layers are employed, it is preferred that each rubber layer of one of these pairs be positioned between the side wall and a portion of the outermost ply of the carcass structure which is adjacent such side wall while each rubber layer of the other pair or pairs is positioned between respective portions of the adjacent two of the carcass plies which are in line with the side walls.

According to a further feature of the present invention, a portion of the tire cover substantially adjacent a boundary between each of the side walls and a corresponding one of the bead portions and adjacent an outer peripheral portion of each rim flange of a rim of a wheel structure on which the tire is mounted is outwardly protruded for assuring a firm engagement of the asssociated bead portion against the rim flange which is maintained even when the tire is pierced and consequently crushed.

Each of the outwardly protruded portions of the tire cover may have a protective layer of rubber material applied externally thereto for the purpose of substantially eliminating the possibility that, when the tire is pierced and consequently deflated, the associated rim flange damages or 'cut' that portion of the tire cover.

BRIEF DESCRIPTION OF THE DRAWING

For a more complete understanding of the present invention, reference will now be had to the accompanying drawing which is a sectional view of a pneumatic tire embodying the present invention.

DETAILED DESCRIPTION OF THE INVENTION

Referring to the accompanying drawing, it will readily be understood that the tire or tire cover 10 so far illustrated comprises a tread portion 11, a pair of side wall portions 12a and 12b opposed to each other and contiguous to both sides of the tread portion 11, and a pair of bead portions 13a and 13b in which bead cores 14a and 14b are respectively embedded.

The tire cover 10 also includes a bias-ply carcass 15 facing a pneumatic chamber 16 defined in the tire cover 10. The bias-ply carcass 15 may be composed of at least two layers of textile cord of natural or synthetic fiber and, so far illustrated, it is shown as composed of four layers of textile cord which are represented by carcass plies 15a, 15b, 15c and 15d adjoining to each other. The cords forming the carcass plies 15a to 15d are alternately laid down on a bias with respect to each other and at a predetermined acute cord angle in any known manner relative to the midcircumferential plane lying at right angles to the plane of the accompanying drawing, which midcircumferential plane appears as a line Y—Y in the drawing because of cross sectional representation of the tire.

Each of the carcass plies 15a to 15d extends between the bead portions 13a and 13b with both ends thereof innerwardly turned up around the respective bead cores 14a and 14b and secured in position within the bead portions 13a and 13b, a substantially intermediate portion thereof extending immediately below the tread portion 11.

The tire cover 10 of the construction so far described is well known to those skilled in the art and is shown as mounted on a rim 5 of one of wheel structures, for example, a front wheel structure, of a motorcycle (not shown) in such a manner that the bead portions 14a and 14b are elastically held flat against rim flanges 6a and 6b at respective sides of the rim 5 and also against bead seats 7a and 7b of the rim 5, respectively, in any known manner.

Preferably, the total thickness of the carcass 15, that is, the sum of thickness of the carcass plies 15a to 15d, is at least 3 or more millimeters.

A reinforcement layer 17, composed of a plurality of textile cords which are arranged in parallel relation to each other and impregnated with a rubber material, is shown as embedded in between the tire and side wall rubber and the radially outermost carcass ply 15a and has both ends terminating adjacent the respective boundaries between the bead portions 13a and 13b and the side wall portions 12a and 12b.

The number of the reinforcement layers of textile cord is not always limited to one as shown, but may be two or more, in which case, while one reinforcement layer is, as shown by 17, positioned in between the tire and the side wall rubber and the radially outermost carcass ply 15a, the other or others may be positioned in between the adjacent pair of carcass plies of the carcass 15. Moreover, even though the single reinforcement layer 17 is shown as employed, the position of the reinforcement layer 17 is not limited to the radially outside of the radially outermost carcass ply 15a, but may be embedded in between any adjacent pair of the carcass plies 15a to 15d.

In any case, the textile cords forming the reinforcement layer 17 may have a cord angle within the range of from 20° to 45° relative to the midcircumferential plane Y—Y and is laid down on a bias relative to the cords of the adjacent one of the carcass plies 15a to 15d which is in contact with such reinforcement layer 17.

It is to be noted that the reinforcement layer 17 cooperates with the carcass plies 15a to 15d to provide a reinforcing structure which represents the principal reinforcing portion of the tire necessary to support a portion of the payload on the motorcycle, which payload portion is imposed on the front wheel and is generally smaller in amount than the amount of the remaining portion of the payload imposed on the rear wheel. Since the reinforcing structure represents the principal reinforcing portion of the tire as stated above, it can sufficiently and adequately support that portion of the payload without substantially giving an excessive rigidity for a tire for use on a front wheel of the motorcycle.

As best shown in the accompanying drawing, each of the side wall portions 12a and 12b has an excrescence 18a or 18b protruding outwards in a direction remote from the pneumatic chamber 17 and formed at a position adjacent the outer periphery of the associated rim flange 6a or 6b when the tire of the present invention is mounted on the rim 5. Each excrescence 18a or 18b extends over the entire circumference of the tire at that position adjacent the outer periphery of the associated rim flange 6a or 6b.

Each of these excrescences 18a and 18b may have any cross sectional shape so far as it sufficiently serves to assure a firm engagement of the associated bead portion 13a or 13b against the adjacent rim flange 6a or 6b without substantially inviting any possible separation of the bead portion from the rim flange when the tire is pierced and consequently deflated.

In order to prevent one or both of the excrescences 18a and 18b on the respective side wall portions 12a and 12b from being damaged by wear in frictional contact with the outer peripheries of the associated rim flanges 6a and 6b of the wheel rim 5, protective layers 19a and 19b one for each side of the tire with respect to the midcircumferential plane Y—Y are applied to outer surfaces of the excrescences 18a and 18b and of portions of the bead portions 13a and 13b which are not in contact with the bead seats 7a and 7b, respectively.

More specifically, the protective layers 19a and 19b are made of rubber material having a suitable hardness, preferably, a JIS hardness of about 70° or more as measured by the method stipulated in the Japanese Industrial Standards for which the abbreviation "JIS" stands. In addition, each of these protective layers 19a and 19b has an annular width, i.e., the difference between the inner and outer diameters thereof, which is so selected that, when it is applied in the manner as shown and described above, an outer periphery of the protective layer 19a or 19b is located at a radially outer position, as at Xa, on the corresponding side wall portion 12a or 12b from which the tire rubber starts to protrude outwards to provide the associated excrescence 18a or 18b, while an inner periphery of the same protective layer 19a or 19b terminates, as at Xb, in flush with a radially innermost side of the associated bead portion 13a or 13b which is held in contact with the bead seat 7a or 7b on the wheel rim 5. Preferably, each of these protective layers 19a and 19b has a maximum thickness of at least 2 mm. at a portion intermediate of the annular width thereof and at a portion thereof which may be held in contact with the outer periphery of the rim flange 6a or 6b when the tire is mounted on the wheel rim 5, which portion is indicated by T. The thickness of respective portions of each of the protective layers 19a and 19b adjacent the inner and outer peripheries thereof is gradually reduced towards the positions Xa and Xb, respectively.

In the pneumatic tire of the present invention, there is provided side reinforcing layers 20a and 20b, one for each side of the tire cover 10, for the purpose of minimizing flexion of the side walls which may occur during its use on the motorcycle and subsequent to the puncture thereof and also keeping the tire in balanced condition relative to the payload on the motorcycle. These side reinforcing layers 20a and 20b are made of rubber material having a hardness substantially equal to that of an undertread immediately below the tread portion 11 and a JIS hardness of about 60°.

In the illustrated embodiment, each of the side reinforcing layers 20a and 20b is shown as embedded in between the reinforcement layer 17 and the radially outermost carcass ply 15a at a position corresponding to the side wall portion 12a or 12b and has an annular width so selected that an outermost periphery thereof is situated at a point Za corresponding to the boundary between the tread portion 11 and the side wall portion 12a or 12b while an innermost periphery thereof is situated at a point Zb corresponding to a shoulder 8a or 8b of the rim flange 6a or 6b of the wheel rim 5.

It is to be noted that the number of pairs of the side reinforcing layers 20a and 20b is not always limited to one as shown, but may be two or more and equal to or less than the number of the carcass plies of the bias-ply carcass 15, in which case, while one pair of the side reinforcing layers are, as shown by 20a and 20b, positioned in between the reinforcement layer 17 and the radially outermost carcass ply 15a in spaced and substantially opposed relation to each other, the other pair or pairs of side reinforcing layers may be positioned in between the adjacent pair of carcass plies. Moreover, even though the single pair of the side reinforcing layers 20a and 20b is employed such as shown, the position of the side reinforcing layers 20a and 20b is not limited to the radially outside of the radially outermost carcass ply 15a and the radially inside of the reinforcement layer 17, but may be embedded in between any adjacent pair of the carcass plies 15a to 15d.

The number of pairs of the side reinforcing layers 20a and 20b is preferably selected in consideration of the possible payload which the front wheel having the tire of the present invention mounted thereon may receive.

With the pneumatic tire embodying the present invention, the construction of which has fully been described, the riding comfort and the high speed steerability of the motorcycle will not be adversely affected particularly when the tire is used on a front wheel of the motorcycle with no relatively excessive payload imposed thereon. Moreover, advantageous is that the possibility of separation of the bead portions from the bead seats on the wheel rim, which often occurs at the time of puncture of the tire, is minimized and, therefore, the motorcycle can be driven at a reasonably high speed to the nearest possible repair shop.

Although the present invention has fully been described in conjunction with the preferred embodiments thereof, it is to be noted that various changes and modifications are apparent to those skilled in the art. Such changes and modifications are to be construed as included within the true scope of the present invention unless they depart therefrom.

I claim:

1. A pneumatic tire for use on a motorcycle, which comprises a tire cover made of a rubber material and having a tread portion, a pair of opposed side walls integrally extending from respective side edges of the tread portion, and a pair of opposed bead portions integrally extending from respective free ends of the individual side walls, said bead portions being adapted to firmly engage with associated rim flanges of a wheel rim, said tire cover including bead cores embedded respectively in the bead portions and a reinforcing structure for preventing the tire from collapsing when it is at least partially deflated which comprises a carcass structure embedded in the tire cover adjacent the inner surface thereof, said carcass structure having a plurality of plies of textile cords which are alternately disposed on a bias with respect to each other and at a predetermined cord angle relative to the midcircumferential plane of the tire, said carcass structure having both ends turned up around the respective bead cores and secured in position adjacent the free ends of the side walls, and at least one reinforcement layer substantially forming a part of the carcass structure and made of a plurality of cords of textile material, said reinforcement layer being laid down on a bias relative to the carcass structure and at a cord angle within the range of from 20° to 45° relative to the midcircumferential plane of the tire and having both ends terminating adjacent respective boundaries between the side walls and the bead portions without being turned up around the associated bead cores, said reinforcing structure representing the principal reinforcing portion of the tire.

2. A pneumatic tire as claimed in claim 1, wherein said reinforcing structure further comprises at least one pair of side reinforcing layers made of a hard rubber material and respectively embedded in between the carcass structure and the reinforcement layer in spaced and substantially opposed relation to each other, each of said side reinforcing structure having an outer periphery, which is situated at a point corresponding to the boundary between the tread portion and the adjacent side wall, and an inner periphery which is situated at a point corresponding to a shoulder of the rim flange when the tire is mounted on the wheel rim.

3. A pneumatic tire as claimed in claim 1, wherein each of the side walls has an outwardly protruding and circumferentially extending excrescence integrally formed therewith at a portion of the side wall which may contact an outer periphery of the corresponding one of the rim flanges when the tire is mounted on the wheel rim.

4. A pneumatic tire as claimed in claim 2, wherein each of the side walls has an outwardly protruding and circumferentially extending excrescence integrally formed therewith at a portion of the side wall which may contact an outer periphery of the corresponding one of the rim flanges when the tire is mounted on the wheel rim.

5. A pneumatic tire as claimed in claim 3, further comprising at least one pair of protective layers made of a hard rubber material, each of said protective layers being applied to outer surfaces of the excrescence and of the bead portion.

6. A pneumatic tire as claimed in claim 4, further comprising at least one pair of protective layers made of a hard rubber material, each of said protective layers being applied to outer surfaces of the excrescence and of the bead portion.

7. A pneumatic tire as claimed in claim 1, wherein the total thickness of the carcass structure is at least 3 mm.

8. A pneumatic tire as claimed in claim 5, wherein the total thickness of the carcass structure is at least 3 mm.

9. A pneumatic tire as claimed in claim 6, wherein the total thickness of the carcass structure is at least 3 mm.

10. In a pneumatic tire for use on a motorcycle, which comprises a tire cover made of a rubber material and having a tread portion, a pair of opposed side walls integrally extending from respective side edges of the tread portion, and a pair of opposed bead portions integrally extending from respective free ends of the individual side walls, said bead portions being adapted to firmly engage with associated rim flanges of a wheel rim, said tire cover including bead cores embedded respectively in the bead portions and a reinforcing structure for preventing the tire from collapsing when it is at least partially deflated which comprises a carcass structure embedded in the tire cover adjacent the inner surface thereof, said carcass structure having a plurality of plies of textile cords which are alternately disposed on a bias with respect to each other and at a predetermined cord angle relative to the midcircumferential plane of the tire, said carcass structure having both ends turned up around the respective bead cores and secured in position adjacent the free ends of the side walls, and at least one reinforcement layer substantially forming a part of the carcass structure and being disposed on a bias relative to the carcass structure and at a cord angle within the range of from 20° to 45° relative to the mid-circumferential plane of the tire and having both ends terminating adjacent respective boundaries between the side walls and the bead portions without being turned up around the associated bead cores, said reinforcing structure representing the principal reinforcing portion of the tire, the improvement wherein said reinforcement layer is made of a plurality of cords of textile material.

* * * * *